(12) United States Patent
Zeng

(10) Patent No.: US 8,645,180 B1
(45) Date of Patent: Feb. 4, 2014

(54) AUTOMATED IMPACT ASSESSMENT AND UPDATES OF COMPLIANCE RESPONSE PLANS PURSUANT TO POLICY CHANGES

(75) Inventor: Ying Zeng, Fremont, CA (US)

(73) Assignee: SAP AG, Walldorf (DE)

( * ) Notice: Subject to any disclaimer, the term of this patent is extended or adjusted under 35 U.S.C. 154(b) by 35 days.

(21) Appl. No.: 13/546,145

(22) Filed: Jul. 11, 2012

(51) Int. Cl.
*G06Q 10/00* (2012.01)

(52) U.S. Cl.
USPC ........................................................ 705/7.19

(58) Field of Classification Search
USPC ........................................................ 705/7.11
See application file for complete search history.

(56) References Cited

U.S. PATENT DOCUMENTS

| | | | | |
|---|---|---|---|---|
| 7,676,389 B2 * | 3/2010 | Jackson et al. | | 705/7.12 |
| 7,818,083 B2 * | 10/2010 | Glenn et al. | | 700/108 |
| 2002/0194014 A1 * | 12/2002 | Starnes et al. | | 705/1 |
| 2006/0282276 A1 * | 12/2006 | Venzon et al. | | 705/1 |
| 2008/0015913 A1 * | 1/2008 | Courtney et al. | | 705/7 |
| 2009/0012834 A1 * | 1/2009 | Fahey | | 705/9 |
| 2009/0119141 A1 * | 5/2009 | McCalmont et al. | | 705/7 |
| 2009/0313037 A1 * | 12/2009 | Stiffler | | 705/1 |
| 2013/0198094 A1 * | 8/2013 | Arazy | | 705/317 |

OTHER PUBLICATIONS

Compliance Tools "Western Independent Bankers 2010 Education Summit & Expo", Nov. 15, 2010, pp. 1-40.*

* cited by examiner

*Primary Examiner* — Romain Jeanty
(74) *Attorney, Agent, or Firm* — Fountainhead Law Group PC

(57) ABSTRACT

A compliance management system is disclosed, including an analysis engine to analyze received compliance requirements. Stakeholders and relevant surveys are identified using results of the analysis. An assessment engine initiates and manages a process to assess the received compliance requirements. Results of the assessment are used to determine changes to existing policies and procedures. A workflow engine initiates and manages workflows to effect changes the policies and procedures.

17 Claims, 4 Drawing Sheets

AUTOMATED IMPACT ASSESSMENT AND UPDATES OF COMPLIANCE RESPONSE PLANS PURSUANT TO POLICY CHANGES

BACKGROUND

Unless otherwise indicated herein, the approaches described in this section are not prior art to the claims in this application and are not admitted to be prior art by inclusion in this section.

Modern businesses are subjected to increasing numbers of regulations from governmental agencies, industry associations, and from within the business enterprise itself. Regulations may cover any aspect of the business enterprise such as employee concerns, product safety, environmental concerns, financial reporting, privacy issues, and so on. Compliance with some regulations may be voluntary, but the majority of regulations require compliance as a matter of law. Non-compliance with legally mandated regulations may incur heavy financial burdens such as fines, loss of business revenue, loss of business opportunity, law suits, and so on. Accordingly, large investments of time, money, and manpower may be expended to develop programs, processes, and infrastructure within the business enterprise to ensure current and ongoing compliance with regulations.

The management of compliance with regulations is made even more challenging because regulations may change over time. The changes may be incremental and gradual, and at times may be significant. A typical business enterprise may have several thousands of policies, procedures, test plans, monitoring controls throughout the enterprise to monitor compliance and respond to potential and actual occurrences of non-compliance. The additional effort of assessing changes when new or updated regulations are published and then having to update the enterprise's compliance policies and procedures may impose a heavy burden to the enterprise.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
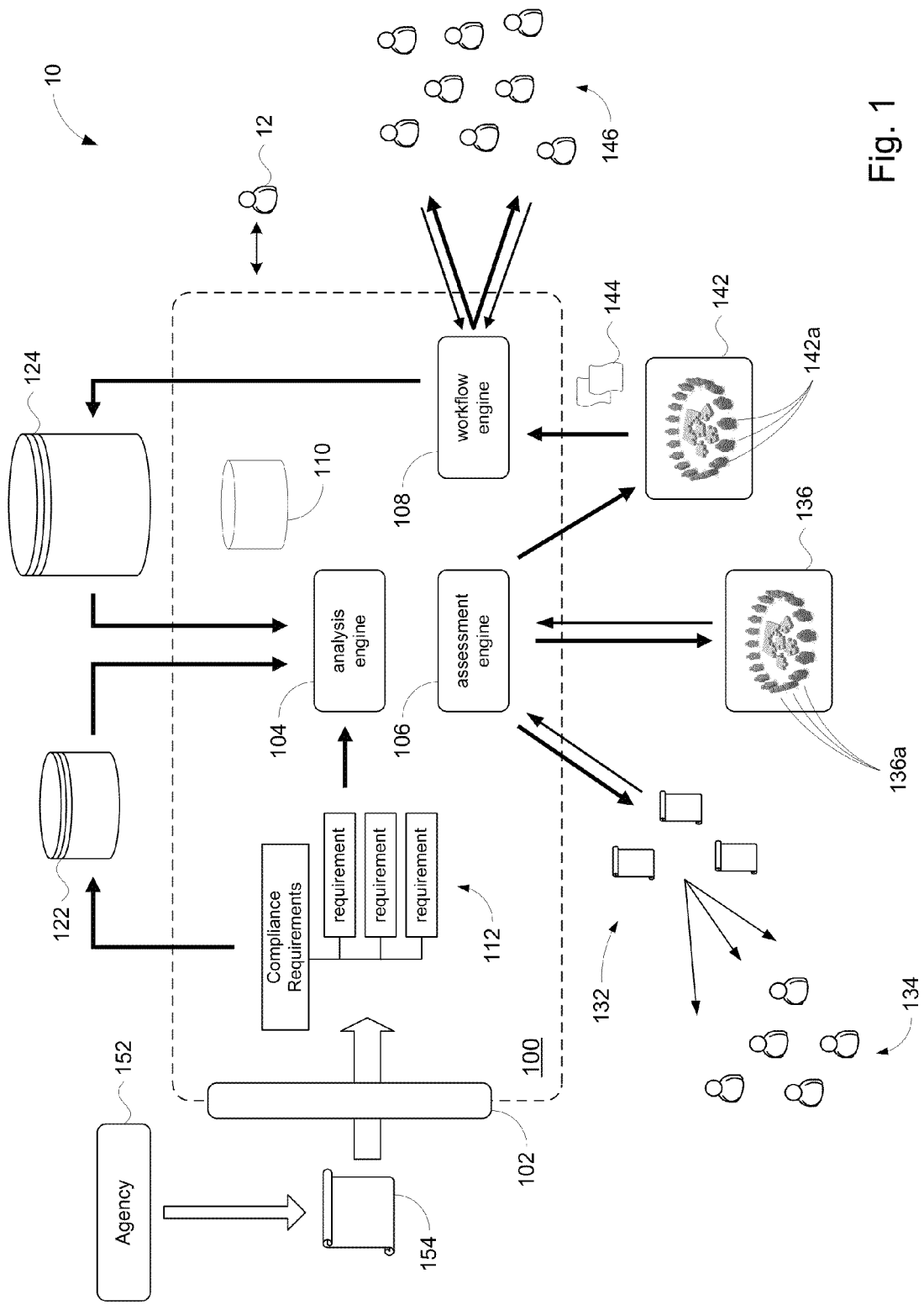
FIG. 1 is a system level figure of an illustrative embodiment of the present disclosure.

FIG. 1 shows a compliance management system 100 in a business enterprise 10 in accordance with the present disclosure. A change manager 12 may be an administrative employee of the business enterprise 10 who interacts with the compliance management system 100 to administer changes to compliance requirements in accordance with the present disclosure. The term "compliance requirements" will be understood as collectively referring to regulations, rules, policies, and so on that are set forth by a regulatory agency, which govern aspects of operations and activities of the business enterprise 10. The regulatory agency is typically separate from the business enterprise 10, but in some embodiments may be a department or group within the business enterprise.

The business enterprise 10 may include a data store 122 comprising a collection of the compliance requirements that are applicable to the activities of the business enterprise. A set of policies and procedures may be developed to ensure compliance with the applicable compliance requirements. A data store 124 may store these policies and procedures, which are specific to the business enterprise 10, for ensuring compliance with the applicable compliance requirements. The data stores 122 and 124 may be embodied in the same storage system, or they may be separate storage systems. The data stores 122 and 124 may represent data tables in a data base system. Other configurations of data stores 122 and 124 are contemplated, of course.

As used herein, "policies and procedures" will be understood to refer to the policies that are developed and managed by the business enterprise 10 to ensure compliance with applicable regulations. In addition, remedial procedures, proactive procedures, responses, controls, test plans, and so on for reporting, monitoring, and responding to matters relating to the business enterprise's compliance of applicable regulations may be collectively referred to as "procedures".

The compliance management system 100 may include an interface 102 for receiving compliance requirements 154 from an agency 152. The agency 152 may be a governmental body (e.g., federal government, state government, or some other local civil governing body). The agency 152 may be an industrial association that regulates the business practices of the business enterprise 10. In some embodiments, the agency 152 may even be a group within the business enterprise 10. As explained above, the compliance requirements 154 may be in the form regulations, policies, goals, and so on set forth by the agency 152.

In some embodiments, the interface 102 may serve as a portal to provide the agency 152 with access to the compliance management system 100. Accordingly, the interface 102 may be a web-based interface. For example, the interface 102 may be based on the simple object access protocol (SOAP), a representational state transfer (REST) data model, and the like. In some embodiments, the interface 102 may actively connect to the agency 152 (e.g., a server running in the agency) and download or otherwise obtain compliance requirements 154 from the agency. In some embodiments, the interface 102 may be a computer system that any employee of the business enterprise 10 may use to input regulations documents; e.g., in a portable document format (PDF). The received compliance requirements 112 may be stored to the data store 122 to update the business enterprise's store of compliance requirements.

The compliance manager 100 may include an analysis engine 104, which analyzes the received compliance requirements 112. The analysis engine 104 may access the data store 122 to retrieve earlier versions of the received compliance requirements 112 or related compliance requirements. In accordance with the present disclosure, and as will be discussed below, the analysis engine 104 may identify changes to compliance requirements ("compliance changes") by analyzing the received compliance requirements 112 and earlier or related compliance requirements obtained from the data store 122.

An assessment engine 106 may initiate an assessment survey to determine whether changes in compliance requirements necessitate changes in policies and procedures of the business enterprise 10. The assessment engine 106 may compile one or more appropriate surveys 132 and send them to survey participants 134. The surveys may be used to gather information that can be used to decide whether or not the business enterprise's policies and procedures need to be changed to accommodate changes in compliance requirements. The assessment engine 106 may also initiate a collaborative effort 136 among meeting participants 136a, instead of or in addition to sending out surveys 132, in order to assess the changes in compliance requirements in a collaborative setting. In some embodiments, a collaborative tool may be used to convene and conduct the collaborative effort 136. For example, the SAP® StreamWork™ is an enterprise collaboration tool that allows real-time collaboration among its participants. Other tools, of course, may be used such as WebEx. The assessment engine 106 may then manage the progress of the assessment survey to its conclusion.

The assessment engine 106 may initiate a second collaborative effort 142 of decision makers 142a to decide, based on results of the surveys 134 and/or the first collaborative effort 136, whether or not changes need to be made to the business enterprise's policies and procedures. The collaborative effort 142 may identify the specific policies and procedures that need to be changed to accommodate changes in the compliance requirements.

The compliance management system 100 may include a workflow engine 108. Changes to the policies and procedures may be specified as workflows. In accordance with the present disclosure, the workflow engine 108 may receive a set of workflows 144 from the collaborative effort 142. The workflow engine 108 may then initiate and manage one or more workflow activities among workflow participants 146 to accomplish the tasks set out by the workflows 144. In some embodiments, responses of the workflow participants 146 may include updates to one or more portions of the policies and procedures. The workflow engine 108 may update the data store 124 of the business enterprise's policies and procedures at the conclusion of the workflow activities.

The compliance management system 100 may include an internal data store 110 to store various information that the other components of the compliance management system may use. Examples of data that may be stored in the internal data store 110 will be described below.

Figure 2:
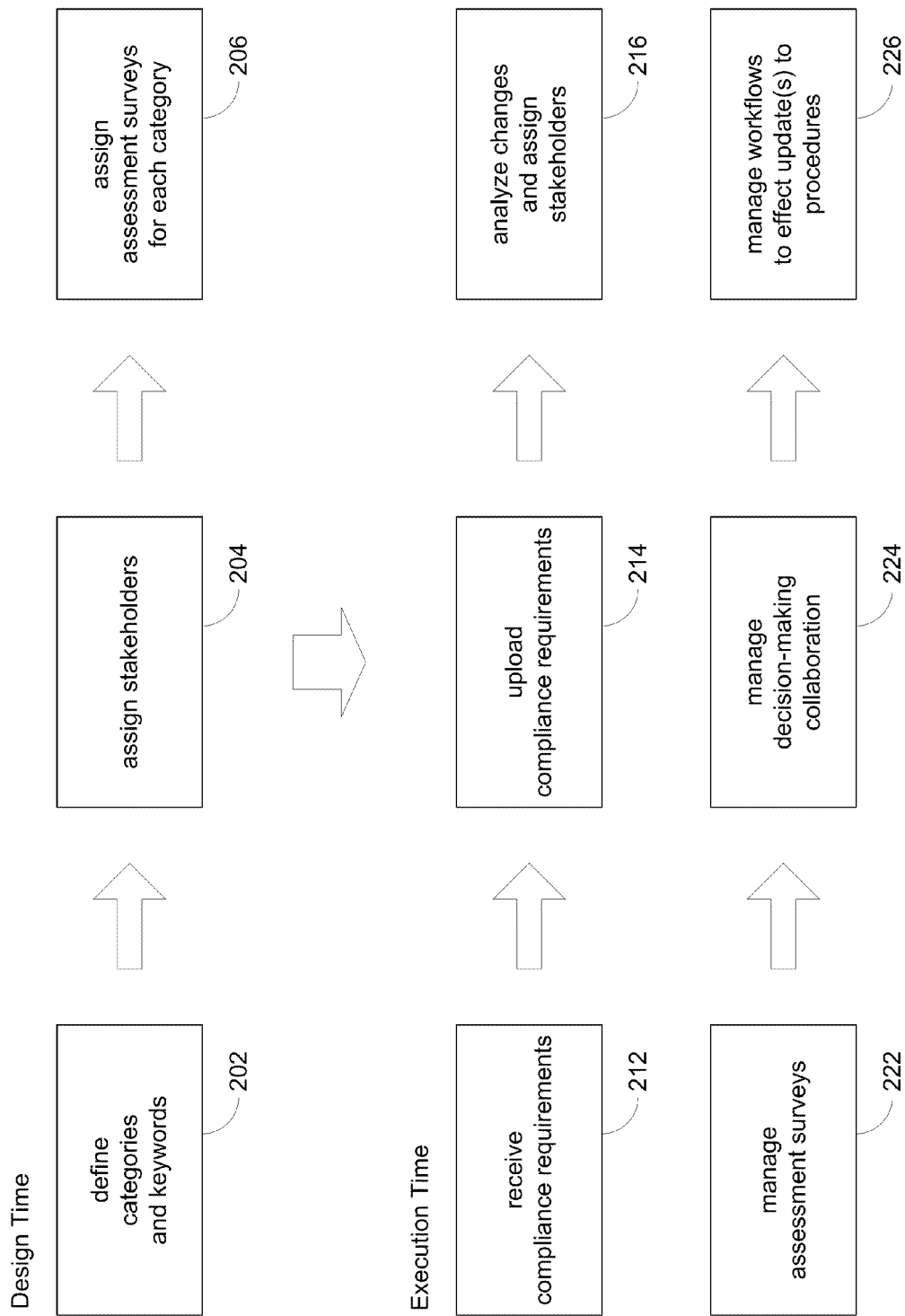
FIG. 2 illustrate process flows in accordance with embodiments of the present disclosure.

FIG. 2 depicts process flows in accordance with principles of the present disclosure. There is a design time process flow and an execution time process flow. The design time process flow relates to setting up the compliance management system 100. The execution time process flow relates to execution steps during operation of the compliance management system 100.

The compliance management system 100 may include a suitable user interface to allow a user (e.g., the change manager 12) to perform design time processing. For example, the compliance management system 100 may include a console that the user "logs" onto, the compliance management system may provide a web services based interface, and so on.

The design time process flow may include processing block 202 for defining categories and keywords. In accordance with the present disclosure, the different compliance requirements of the business enterprise 10 may be categorized according to subject areas or operational groups of the business enterprise. For example, federal, state, and local regulations may relate to general subject areas such safety in the workplace, sexual harassment, and so on which are not related to any one group. Accordingly, there may be a category of compliance regulations called "workplace safety", another category called "sexual harassment", and so on. A human resources department may manage compliance requirements categorized under these general subject areas. Compliance requirements may be directed to specific groups or department in the business enterprise 10; e.g., financial regulations may apply to the business enterprise's accounting department, manufacturing regulations may apply to production groups in the business enterprise, and so on. The categories may be defined by the change manager 12.

Figure 3:
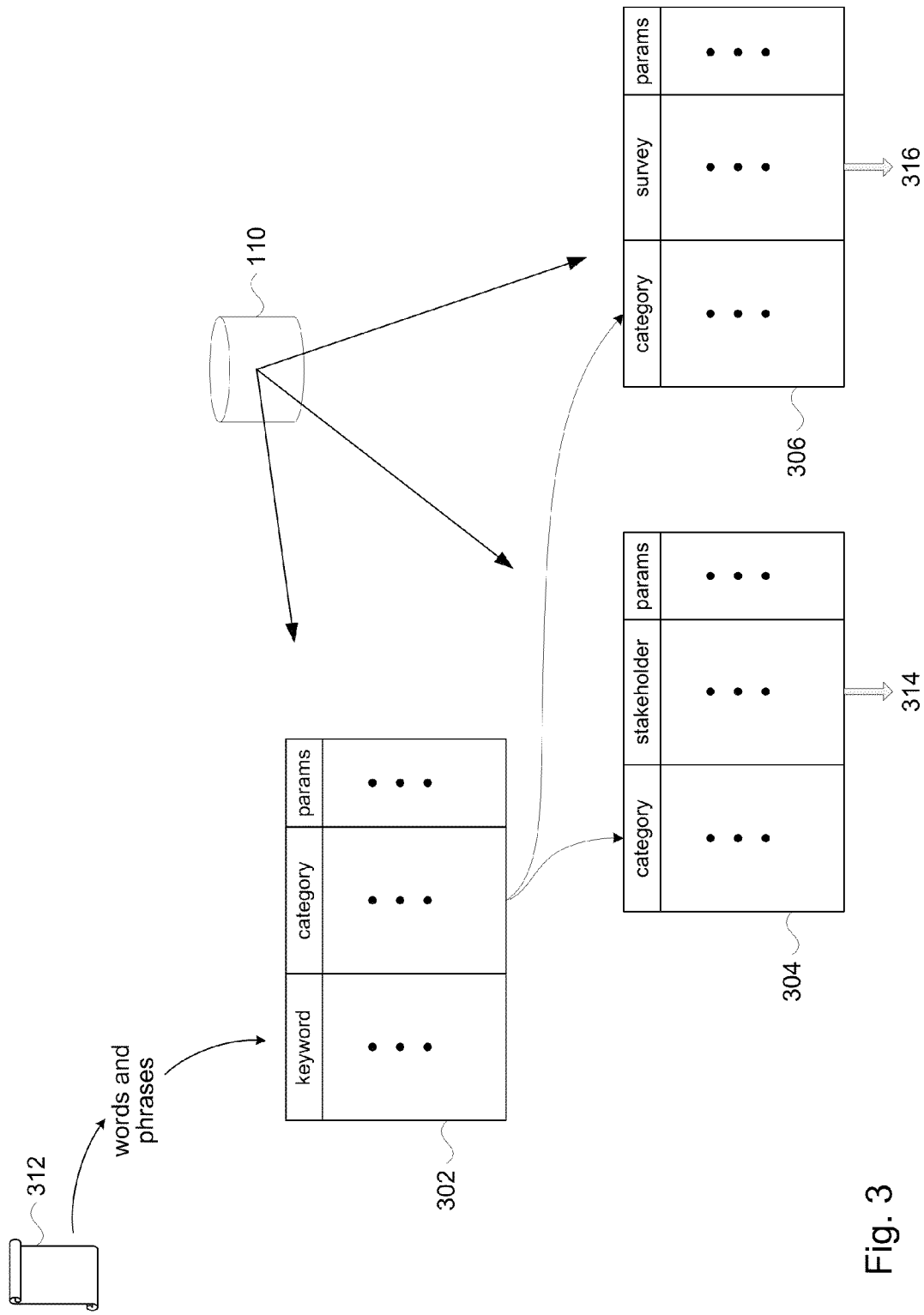
FIG. 3 illustrates some data flows in accordance with the present disclosure.

In some embodiments, each defined category may be defined by, described by, or otherwise associated with keywords that may appear in the documents that comprise the compliance requirements. It will be understood that "keywords" may include word phrases in addition to individual words. The categories and their corresponding keywords may be stored in the internal data store 110 of the compliance management system 100. Referring for a moment to FIG. 3, for example, the internal data store 110 may implement a database system comprising data tables 302, 304, and 306. A category data table 302, for example, may store associations between keywords and categories.

In a processing block 204, "stakeholders" may be identified and assigned or associated with the categories defined in processing block 202. A stakeholder refers to a person (e.g., administrative person) or group within the business enterprise 10 who has some role in the administration of a given set of compliance requirements. That role may involve ensuring that the compliance requirements are met (e.g., a manager type), performing the actions to comply, administering compliance documents, and so on. A category of compliance requirements may be associated with many people and/or groups within the business enterprise 10. People and groups within the business enterprise 10 may be associated with several categories of compliance requirements. The associations between categories and stakeholders may be stored in the internal data store 110 of the compliance management system 100. For example, in FIG. 3 a stakeholder data table 304 may store associations between categories and stakeholders.

In a processing block 206, assessment surveys (e.g., surveys 132) may be defined and assigned or otherwise associated with the categories defined in processing block 202. Each category of compliance requirements may have one or more assessment surveys. Assessment surveys may be questionnaires, such a multiple choice questions, fill-in-the-blank type questions, essays, and so on. In accordance with the present disclosure, the assessment surveys may be designed to elicit input from survey participants which can be subsequently used to make a decision on whether any of the business enterprise's policies and procedures need to be updated. The associations between categories and assessment surveys may be stored in the internal data store 110 of the compliance management system 100. For example, in FIG. 3 a survey data table 306 may store associations between categories and assessment surveys.

The discussion will now focus on the execution time process flow, also shown in FIG. 2. In a typical usage scenario, execution time processing may be triggered by the change manager 12 (FIG. 1). For example, the change manager 12 may be an administrative person in the business enterprise 10 who has responsibility for managing the business enterprise's policies and procedures for complying with applicable compliance requirements. The change manager 12 may be informed or otherwise become aware of new or updated compliance requirements that may require a review/assessment of the business enterprise's current policies and procedures. In another usage scenario, an agency (e.g., 152, FIG. 1) may access the compliance management system 100 via interface 102 and inform the compliance management system of new or updated compliance requirements. The compliance management system 100 may then alert the change manager 12 of the new or updated compliance requirements, for example, by sending an email or otherwise contacting the change manager. In response, the change manager 12 may trigger execution time processing in the compliance management system 100.

In accordance with the present disclosure, the compliance management system 100 may be invoked to assess and effect any changes to relevant policies and procedures of the business enterprise 10 that may be impacted when changes to compliance requirements occur. Likewise, the compliance management system 100 may be invoked when a new set of compliance requirements are made by an agency. Thus, in addition to the business enterprise 10 developing a corresponding new set of policies and procedures for the new compliance requirements, the business enterprise may need to assess the impact of the new compliance requirements on related existing policies and procedures.

The execution time process flow may include a processing block 212 for receiving new or updated compliance requirements. In embodiments, the change manager 12 may submit the received compliance requirements to the compliance management system 100, or the received compliance requirements may be input from another source (e.g., agency 152).

In a processing block 214, the compliance management system 100 may upload the received compliance requirements. For example, compliance requirements may be received at the interface 102 in any of several data formats, such as textual data, data in a spreadsheet, image data, as PDF document, and so on. It may be practical for the compliance management system 100 to process documents to have a common data format. Accordingly, the process of uploading the received compliance requirements may include reformatting the received data to a suitable data format (e.g., text data). It will be appreciated that other processing may be performed on the documents, for example in order to facilitate the compliance management system 100 in processing the received compliance requirements.

In a processing block 216, the analysis engine 104 may analyze the received compliance requirements. The analysis may be automatically initiated after the new or updated compliance requirements have been received and uploaded per processing blocks 212 and 214. Or, in some embodiments, the analysis may be explicitly triggered by the change manager 12.

In some embodiments, the analysis engine 104 may perform a comparison between the received compliance requirements and the current compliance requirements. The analysis engine 104 may extract or otherwise identify words and phrases contained in any differences between the received compliance requirements and current compliance requirements (e.g., obtained from data store 122). The analysis engine 104 may also extract words and phrases from the contents of the received compliance requirements. The words and phrases may then be matched against the keywords defined in processing block 202 and stored in the internal data store 110 for subsequent processing. In some embodiments, the change manager 12 may guide the analysis. For example, if too many categories have been identified, the analysis engine 104 may alert the change manager 12 who may then intervene to refine the identification of appropriate categories. If the analysis engine 104 did not identify any categories, then the change manager 12 may be alerted to manually identify one or more appropriate categories.

Referring again to FIG. 3, the figure shows an example of new or updated compliance requirements 312 that have been uploaded to the compliance management system 100. Words and phrases identified from the contents of compliance requirements 312 may be used to identify one or more categories. For example, the words and phrases may be used to search the category data table 302 to identify one or more categories. As FIG. 3 further illustrates, the identified categories may then be used to search the stakeholder data table 304 and the survey data table 306 to identify corresponding stakeholders 314 and assessment surveys 312, respectively.

Continuing with FIGS. 2 and 3, having identified the stakeholders 314 and assessment surveys 316 that correspond to the compliance requirements 312, in processing block 222 the assessment engine 106 may initiate and mange an assessment survey to assess the new or updated compliance requirements. In some embodiments, the assessment surveys 316 may comprise survey forms that are sent to respective stakeholders 314 (e.g., survey participants 134, FIG. 1). The stakeholder data table 304 may include parameters for each stakeholder that informs the assessment engine 106 how assessment surveys 316 can be delivered to them; e.g., an email address, an office location, etc. Parameters in the survey data table 306 may inform the assessment engine 104 which stakeholders 314 should receive which assessment surveys, and so on. In some embodiments, the change manager 12 may review the list of stakeholders 314 and assessment surveys 316 that the assessment engine 106 had identified, and make revisions if needed. The change manager 12 may then trigger the distribution of assessment surveys 316 to respective stakeholders 314. In addition to the assessment surveys 316, additional information may be provided to each stakeholder 314; e.g., old and new versions of the compliance requirements, etc.

In some embodiments, the parameters in the data tables 302-306 may indicate to the assessment engine 106 that a collaboration among certain stakeholders 314 should be conducted. For example, a particular category, such as "sexual harassment" may be of special importance that changes in compliance requirements relating to sexual harassment require a meeting of certain stakeholders, for example, department heads. Alternatively the change manager 12 may make a decision to conduct a meeting of stakeholders. Accordingly, the assessment engine 106 may invoke a collaboration tool to schedule and coordinate stakeholders 314 to convene a survey meeting to assess the new or updated compliance requirements.

After initiating the assessment survey activity, such as sending out survey forms and/or arranging survey meetings, the assessment engine 106 may monitor the progress of the assessment survey. For example, if surveys forms are sent out to stakeholders, the assessment engine 106 can track which stakeholders have responded to the survey forms. Likewise, if a survey meeting was arranged, the assessment engine 106 can track whether or not minutes of the meeting had been submitted. The assessment engine 106 may report to the change manager 12 which stakeholders have and have not responded to survey forms, the progress of survey meetings, whether meeting minutes have been received from those survey meetings, and so on. The assessment engine 106 may determine that the assessment survey is complete; for example, when it has received responses from every stakeholder. In some embodiments, the change manager 12 may make the determination that the assessment survey has completed. For example, if a stakeholder does not respond to a survey, the assessment engine 106 may never consider the assessment survey to be complete. However, the change manager 12 may step in and designate the assessment survey as nonetheless being complete so that the execution time process flow can proceed.

In a processing block 224, the assessment engine 106 may initiate and manage a decision-making collaboration to (1) decide whether or not policies and procedures of the business enterprise 10 need to be updated and (2) identify what those updates should be. For example, in some embodiments, decision makers (e.g., 142a, FIG. 1) may be identified from among the stakeholders 314 identified in processing block 216. In other embodiments, the decision makers may be manually selected by the change manager 12. The assessment engine 106 may coordinate a meeting of the decision makers and supply them (e.g., via email) with materials needed to conduct the meeting, including results the assessment survey, current relevant policies and procedures, and the like.

The decision makers may decide whether or not any of the relevant policies and procedures need to be updated. The decision makers may determine what changes are needed to the relevant policies and procedures and may dictate how those changes are to be implemented. A meeting minutes or other report may be produced from the meeting of the decision maker and submitted to the compliance management system 100. The change manager 12 may review the submitted material and define one or more workflows based on the changes specified by the decision makers. The workflows may be submitted to the workflow engine 108. In some embodiments, the workflows may be automated to some degree. Foe example, the decision makers may make a list of policies and procedures that need to be changed. The list may constitute the workflows.

In processing block 226, the workflow engine 108 may trigger processing of one or more workflows for implementing changes to the business enterprise's policies and procedures as set forth by the decision makers. In some embodiments, the change manager 12 may interact with the workflow engine 108 to develop and design suitable workflows. The workflows may specify workflow recipients and workflow tasks. The workflow tasks may be updates to the individual policy documents, test plans, responses, control documents, and the like which constitute the policies and procedures affected by the new or updated compliance requirements. The workflow recipients may be personnel in the business enterprise 10 such as department heads, managers, group leaders, and so on.

The workflow engine 108 may distribute the workflows to the workflow recipients. Each workflow recipient may be given responsibility for ensuring that their assigned workflow task is completed. In some embodiments, the end result of the workflows represent an update of the policies and procedures that are affected by the compliance requirements received in processing block 212. The updated policies and procedures may then be stored on data store 124, thus updating the business enterprise's data store of policies and procedures. In some embodiments, the workflow engine 108 and/or the change manager 12 may conduct review process of the updated policies and procedures before storing them to data store 124.

Figure 4:
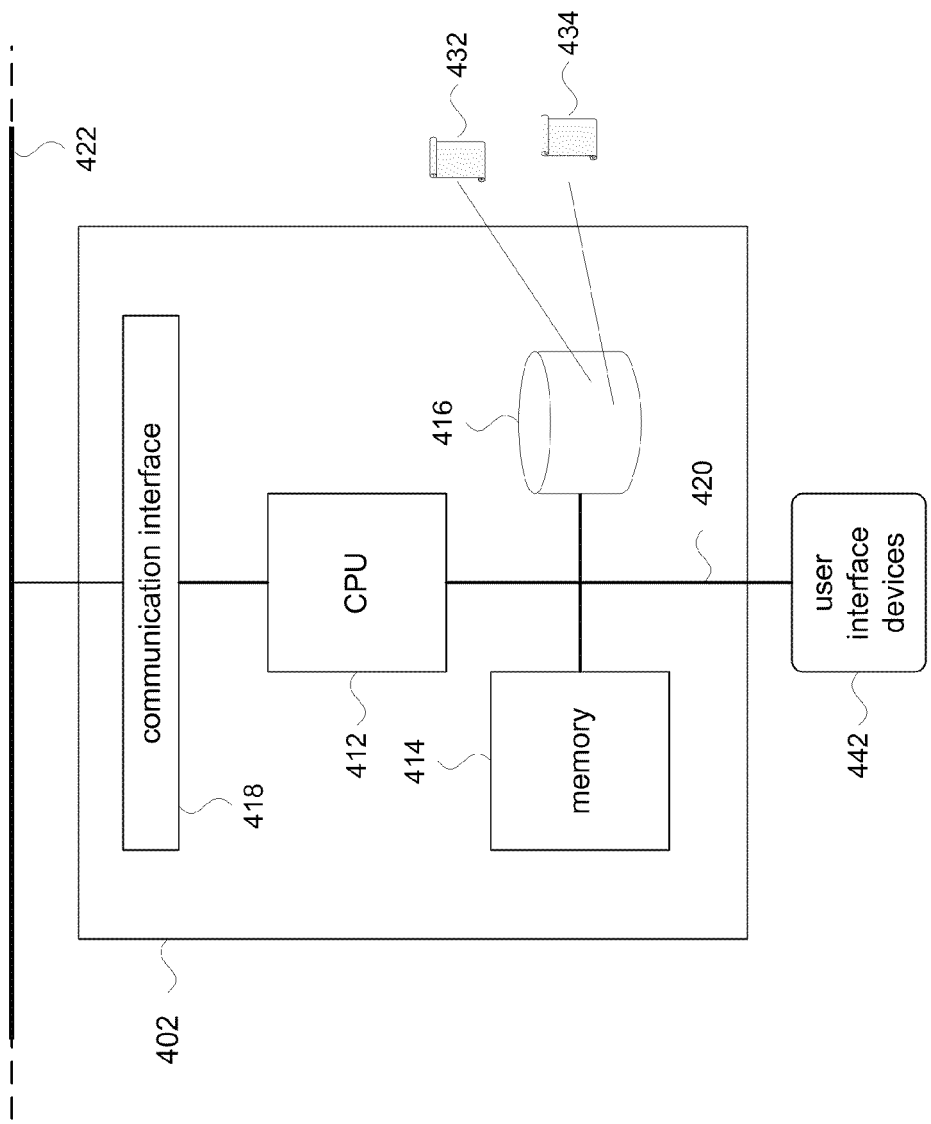
FIG. 4 is a system diagram of a particular instance of a compliance management system according to the present disclosure.

A particular embodiment of the compliance management system 100 in accordance with the present disclosure is illustrated in FIG. 4, showing a high level block diagram of a computer system 402 configured to operate in accordance with the present disclosure. The computer system 402 may include a central processing unit (CPU) or other similar data processing component. The computer system 402 may include various memory components. For example, the memory components may include a volatile memory 414 (e.g., random access memory, RAM) and a data storage device 416. A communication interface 418 may be provided to allow the computer system 402 to communicate with an outside agency (e.g., agency 152) over a communication network 422, such as a local area network (LAN), the Internet, and so on. An internal bus 420 may interconnect the components comprising the computer system 402.

The data storage device 416 may comprise a non-transitory computer readable medium having stored thereon computer executable program code 432. The computer executable program code 432 may be executed by the CPU 412 to cause the CPU to perform steps of the present disclosure. For example, the computer executable program code 432 may include code for the design time process flow, and code for the execution time process flow. The data storage device 416 may store data structures 434 such as the data tables 302-306. The change manager 12 may interact with the computer system 402 using suitable user interface devices 442. They may include, for example, input devices such as a keyboard, a keypad, a mouse or other pointing device, and output devices such as a display.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method for managing compliance requirements in an enterprise comprising steps of:
a computer system receiving compliance requirements, the computer system comprising a processor, the computer system identifying compliance changes as differences between the received compliance requirements and previously received compliance requirements; the computer system conducting one or more surveys relating to the received compliance requirements with one or more survey participants, the computer system initiating a collaboration to decide, using results of the surveys, whether or not to update policies and procedures of the enterprise in order to accommodate the received compliance requirements, the computer system managing a plurality of workflows relating to updating the policies and procedures of the enterprise in order to accommodate the received compliance requirements,
wherein initiating a collaboration comprises the computer system identifying a plurality of decision-making participants based on contents of the received compliance requirements and on contents of the compliance changes, and scheduling a meeting among the plurality of decision-making participants.

2. The method of claim 1 wherein conducting one or more surveys comprises the computer system determining that the surveys have been completed, wherein initiating a collaboration occurs upon completion of the surveys.

3. The method of claim 1 wherein conducting one or more surveys comprises the computer system identifying the surveys and the survey participants based on contents of the received compliance requirements and on contents of the compliance changes.

4. The method of claim 1 wherein conducting one or more surveys comprises the computer system identifying a plurality of survey participants and scheduling a meeting among the plurality of survey participants.

5. The method of claim 1 wherein managing a plurality of workflows comprises the computer system distributing the workflows to workflow recipients.

6. The method of claim 5 wherein managing a plurality of workflows comprises the computer system receiving completed workflows from the workflow recipients, wherein updates to the policies and procedure comprise the completed workflows.

7. A system in an enterprise comprising:
a computer system;
a storage system; and
computer-executable program code stored on the storage system which, when executed by the computer system, causes the computer system to:
receive compliance requirements;
identify compliance changes as differences between the received compliance requirements and previously received compliance requirements;
conduct one or more surveys relating to the received compliance requirements with one or more survey participants;
initiate a collaboration to decide, using results of the surveys, whether or not to update policies and procedures of the enterprise in order to accommodate the received compliance requirements; and
manage a plurality of workflows relating to updating the policies and procedures of the enterprise in order to accommodate the received compliance requirements, wherein initiating a collaboration comprises the computer system identifying a plurality of decision-making participants based on contents of the received compliance requirements and on contents of the compliance changes, and scheduling a meeting among the plurality of decision-making participants.

8. The system of claim 7 wherein the computer system further determines that the surveys have been completed, wherein the collaboration is initiated upon completion of the surveys.

9. The system of claim 7 wherein the computer system identifies the surveys the survey participants based on contents of the received compliance requirements and on contents of the compliance changes.

10. The system of claim 7 wherein conducting one or more surveys comprises the computer system identifying a plurality of survey participants and scheduling a meeting among the plurality of survey participants.

11. The system of claim 7 wherein managing a plurality of workflows comprises the computer system distributing the workflows to workflow recipients.

12. The system of claim 11 wherein managing a plurality of workflows comprises the computer system receiving completed workflows from the workflow recipients, wherein updates to the policies and procedure comprise the completed workflows.

13. A non-transitory computer readable storage medium having stored thereon computer executable program code which, when executed by a computer system, caused the computer system to perform steps of:
receiving compliance requirements;
identifying compliance changes as differences between the received compliance requirements and previously received compliance requirements;
conducting one or more surveys relating to the received compliance requirements with one or more survey participants;
initiating a collaboration to decide, using results of the surveys, whether or not to update policies and procedures of the enterprise in order to accommodate the received compliance requirements; and
managing a plurality of workflows relating to updating the policies and procedures of the enterprise in order to accommodate the received compliance requirements, wherein initiating a collaboration comprises the computer system identifying a plurality of decision-making participants based on contents of the received compliance requirements and on contents of the compliance changes, and scheduling a meeting among the plurality of decision-making participants.

14. The non-transitory computer readable storage medium of claim 13 wherein conducting one or more surveys comprises the computer system determining that the surveys have been completed, wherein initiating a collaboration occurs upon completion of the surveys.

15. The non-transitory computer readable storage medium of claim 13 wherein conducting one or more surveys comprises the computer system identifying the surveys and the survey participants based on contents of the received compliance requirements and on contents of the compliance changes.

16. The non-transitory computer readable storage medium of claim 12 wherein conducting one or more surveys comprises the computer system identifying a plurality of survey participants and scheduling a meeting among the plurality of survey participants.

17. The non-transitory computer readable storage medium of claim 13 wherein managing a plurality of workflows comprises the computer system distributing the workflows to workflow recipients.

* * * * *